(12) United States Patent
Chen

(10) Patent No.: US 7,405,849 B2
(45) Date of Patent: Jul. 29, 2008

(54) SCANNING DEVICE BY CURVILINEAL MOTION

(75) Inventor: Chiu-Lian Chen, Hsin-Chu Science-Based Industrial Park (TW)

(73) Assignee: Transpacific Optics LLC, Wilmington, DE (US)

( * ) Notice: Subject to any disclaimer, the term of this patent is extended or adjusted under 35 U.S.C. 154(b) by 722 days.

(21) Appl. No.: 10/886,582

(22) Filed: Jul. 9, 2004

(65) Prior Publication Data

US 2006/0007506 A1    Jan. 12, 2006

(51) Int. Cl.
*H04N 1/04* (2006.01)
(52) U.S. Cl. ........................ 358/493; 358/474
(58) Field of Classification Search ................ 358/493, 358/474
See application file for complete search history.

(56) References Cited

U.S. PATENT DOCUMENTS

| 1,857,130 | A | 5/1932 | Alexanderson |
| 2002/0114023 | A1* | 8/2002 | Kao ............................ 358/505 |
| 2004/0169894 | A1* | 9/2004 | Schroath et al. ............. 358/474 |

* cited by examiner

*Primary Examiner*—Twyler L. Haskins
*Assistant Examiner*—Fred Guillermety
(74) *Attorney, Agent, or Firm*—Perkins Coie LLP

(57) ABSTRACT

The present invention relates to a curvilinear scanner including a main unit, a transmission mechanism, a curvilinear transmission shaft, a curviform document stand and an optical sensing module. During the scanning process, the optical sensing module conducts a curvilineal movement. Since the motion vector on the horizontal axis is shorter, it reduces the volume of the scanning device. By the curvilinear scanning way, it can scan an article with curve surface.

20 Claims, 6 Drawing Sheets

SCANNING DEVICE BY CURVILINEAL MOTION

BACKGROUND OF THE INVENTION

1. Field of the Invention

The present invention relates to an optical scanning device, particularly to a design of scanning documents in curvilinear movement.

2. Background Description

Referring to FIG. 1 and FIG. 2 for the three dimension drawings of the known flat scanning device, generally the known platform style scanning device is mostly the platform style desktop CCD optical scanner. The operation is: first, place the platform style scanner unit 11 on table; next, place the document to be scanned in the scanning area; close the upper cover 12; then, get connected with a computer via cable; afterward, plug the power cord in the electric outlet, push the button and start to scan.

The circuit structures of both the known traditional platform style optical scanner and the innovation of the present invention mainly relates to a scanning device, which is able to link with a computer to process the output of the image signal; wherein the CCD (Charge Couple Device) in the image sensing unit senses to drive, via a built-in analog multiplexer, the analog signal is asynchronously output, next the CCD enlarging converter magnifies the image signal and offsets the direct current, afterward via a analog/digital converter, the asynchronous analog signal is converted into the storable digital image signal, finally the image signal is saved in memory buffer, and the position control device controls the mirror and the position of the lamp to scan the document waiting to be scanned. Briefly, the known optical scanning technique is: using CCD sensor to sense to drive, the analog signal is asynchronously output driven by a built-in analog multiplexer, the direct current is offset by a voltage converter in order to acquire the more precise waveform, next magnifying the image signal prevents the interruption, then the analog signal is converted into the digital image signal and saved into a memory buffer, position control device controls the mirror and the position of the lamp to scan the document waiting to be scanned.

As for mechanism structure, the scanning structure of the known traditional platform style scanner is a desktop optical scanning structure. The known desktop scanner takes CCD (Charge Couple Device) optical scanning device using cathode lamp for the light source as the main unit to scan the documents. Regarding the scanner nowadays, though the optical scanning unit generally called CIS (Contact Image Sensor) has replaced CCD, there still exist the space and usage limitation of the structure of the known traditional platform scanner, such as occupy too much the applicable space, need to be placed on table, inconvenient to be carried around and so on; therefore, the inventor proposed the present invention, the character of the present invention is right to improve the known traditional bulky voluminous platform style scanner's drawbacks of wasting the applicable space and inconvenient usage and storage. As shown in FIG. 2, the traditional scanner has to be placed horizontally on table, with the driving device 21 being propelled by the driving unit 22, the optical sensing unit 24 in accord with the linear style transmission shaft 23 scans in linear way.

SUMMARY OF THE INVENTION

In view of the drawbacks of the structure of the known traditional platform scanner stated above, the primary purpose of the present invention is to greatly reduce the occupied space while scanning with the structure of the curvilinear optical scanning. The dimension of the scanner unit is not restricted by the paper size anymore, for instance, a normal size scanner can not scan a letter size paper popular in Western in single time; it is a shortcoming of the typical scanning device in linear motion.

Especially for a common user, the applicable horizontal space on or under table is limited, the present invention is able to break the traditional styling of the scanner, so that the scanner unit can be vertically up extended; that is, the scanning motion is changed from linear to curvilinear in order to save the applicable space. In addition, because the curvilinear style scanner is much smaller, easy to be carried and effortless to be manufactured, the present invention also achieves the secondary purpose of the manufacturing costdown, convenient usage and easy storage.

Moreover, the special chain motion mechanism can be designed into the curvilinear style scanner to drive the optical sensing unit, thus, the scanner can also scan the articles with irregular curves, in particular to scan in circular motion of rolling on the circumference of the article's waist; furthermore, the present invention can perform the continuous or discontinuous multi-curve scanning.

The present invention relates to an optical scanning device, particularly to a design of scanning documents in curvilinear movement driven by a chain motion mechanism; wherein the chain motion mechanism links with an optical sensing unit, further to push the optical sensing unit to move on a curviform document stand; finally it accomplishes the purpose of scanning a document. The character of the innovation of the present invention is primarily to improve the drawbacks of the known bulky voluminous platform style scanner, such as waste of the applicable space and the inconvenient usage, further to advance to the method of curvilinear optical scanning, finally to reach the goals of saving space, handy in use and easy storage. Moreover, with the prosperous development of the 3-D scanner nowadays, the design of the curvilinear scanner can fit perfectly to the 3-D article, so it satisfies the request of scanning more precisely.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In order to provide a clear description and better understanding, charts/diagrams are not drawn in proportion and relative scale. The size of some parts is also exaggerated compared in scale to other related parts. To be more concise, irrelative details are not drawn completely.

Figure 1:
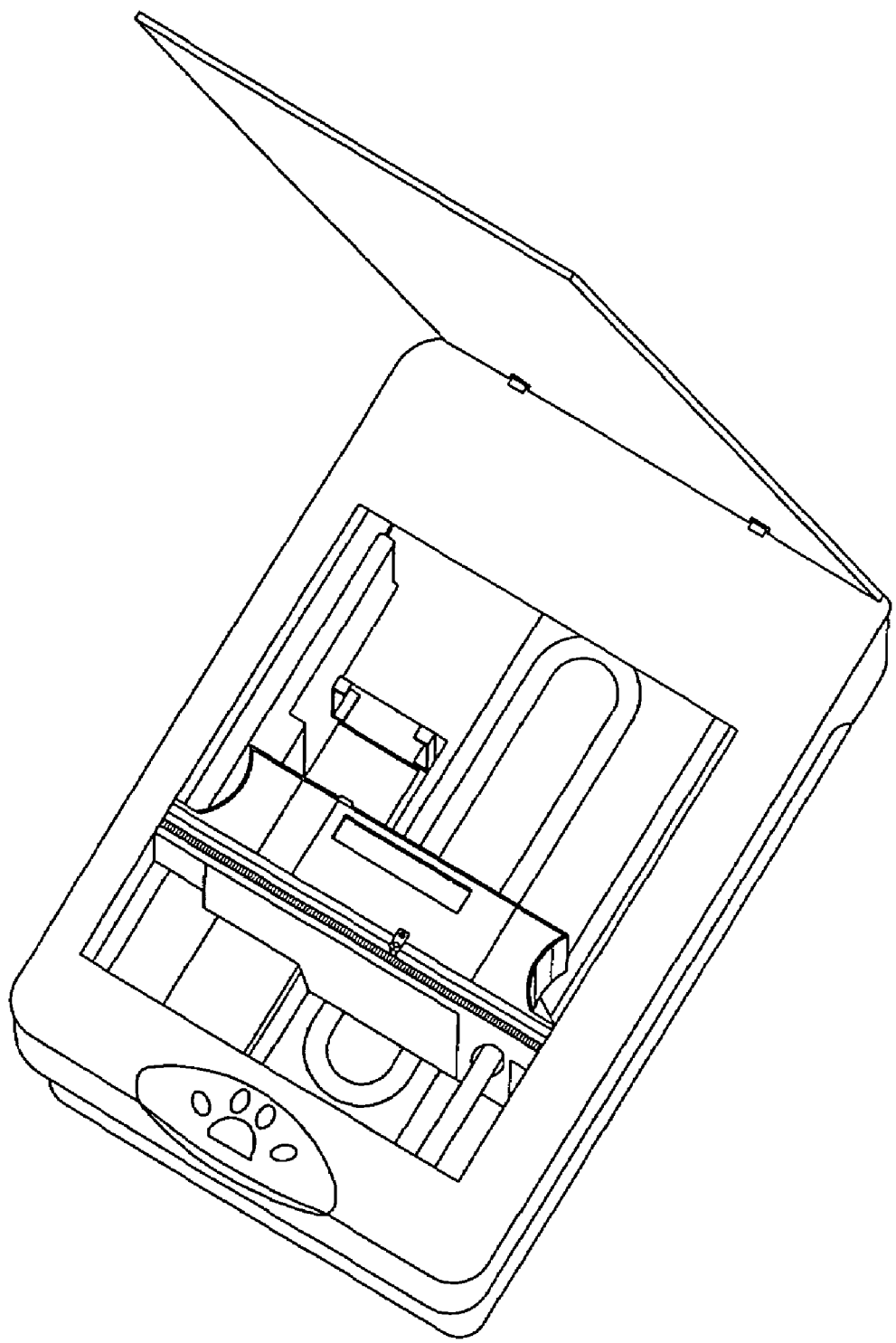
FIG. 1 is the three-dimension drawing showing the known platform style scanning device.
Figure 2:
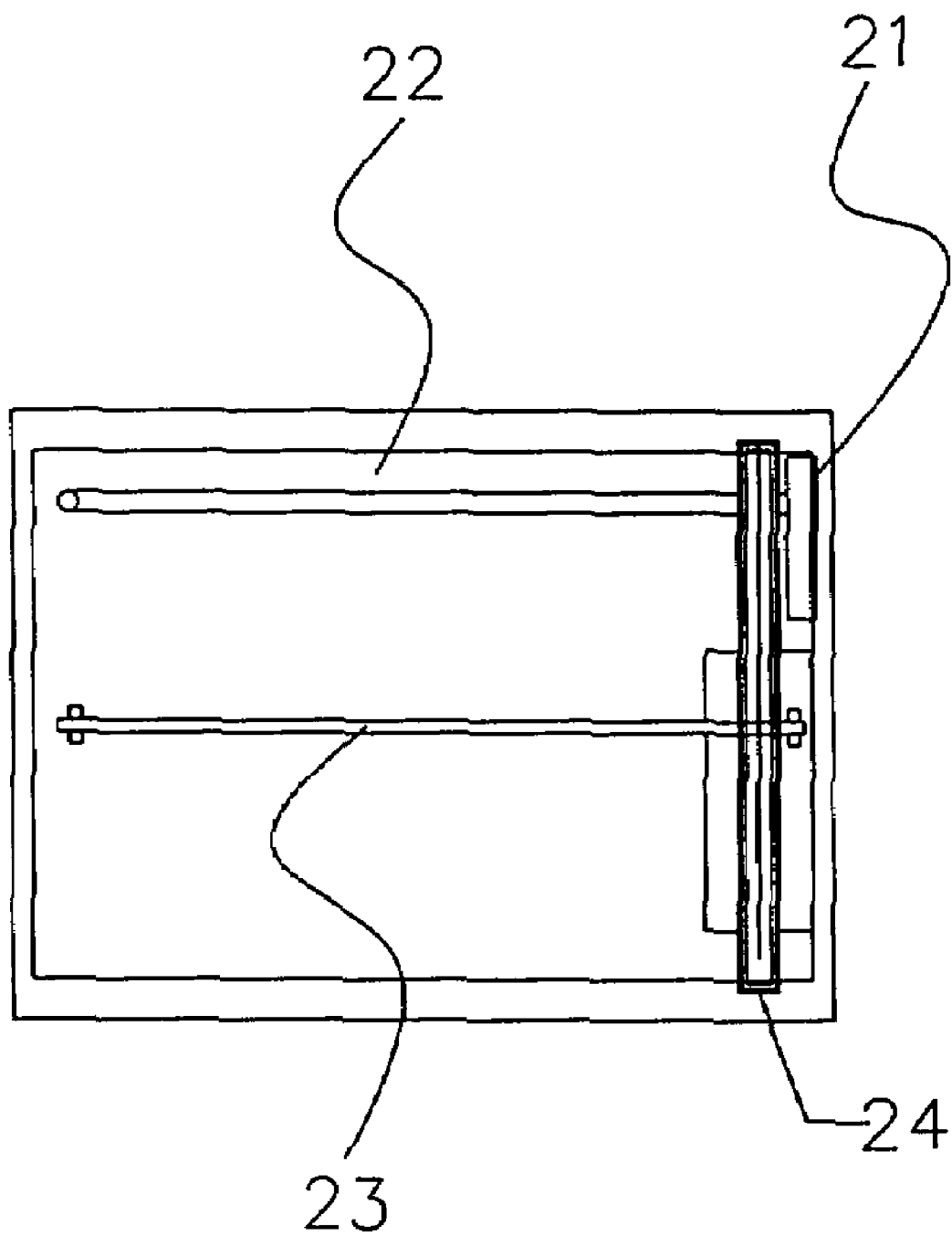
FIG. 2 is the top view of the internal structure of the known platform style scanning device.
Figure 3:
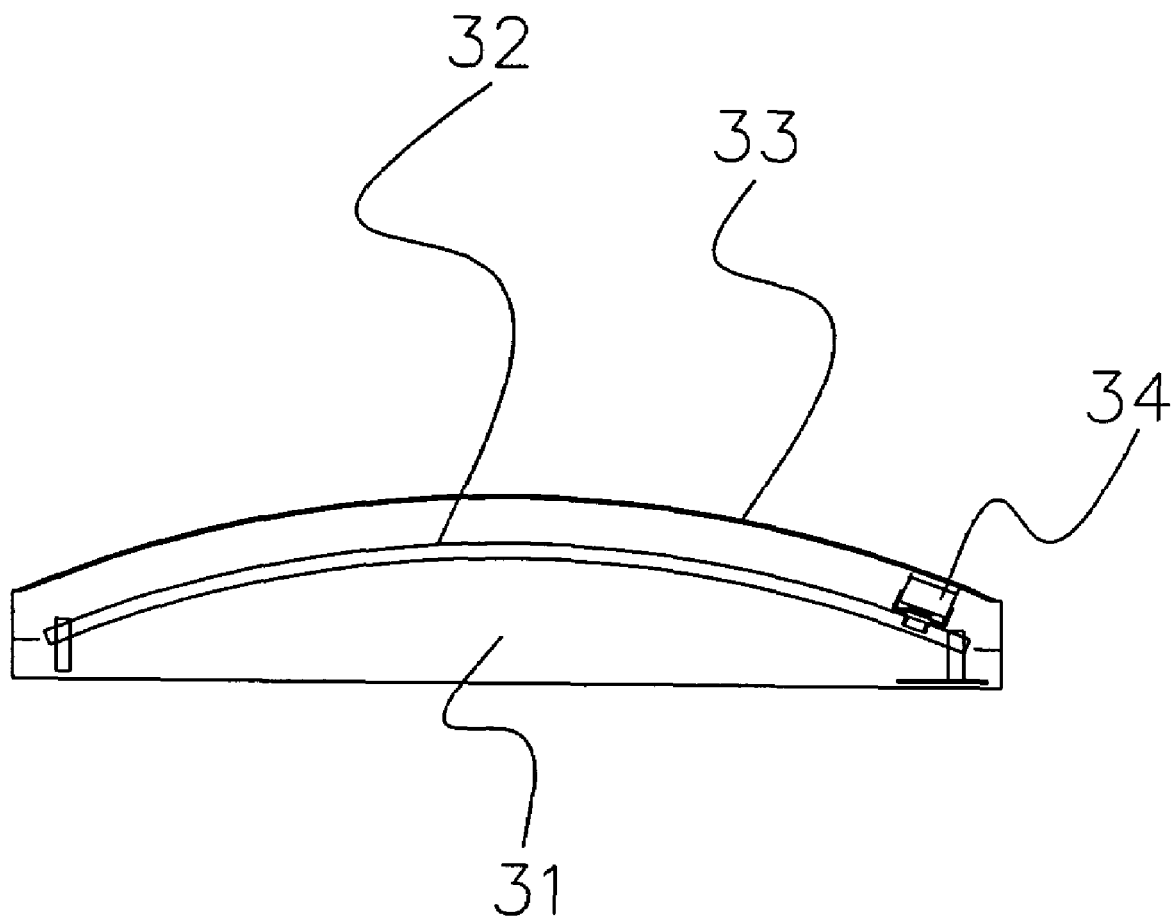
FIG. 3 is the diagram of the first exemplary implementation of the present invention.

The present invention is mainly to improve the structure of the known traditional desktop optical scanning device. As shown in FIG. 3, the present invention relates to a curvilinear style scanner including: a main unit 31, a curviform document stand 33, a curvilinear transmission shaft 32, and an optical scanning module 34. In the main unit 31, there are the necessary electric device, connectors, mechanism and so on; also, this main unit can be placed to wherever the user likes, for example, on the top of computer table or on the top of computer system. The transmission shaft 32 is propelled by a driving device (not shown in the drawing) in order to move the optical sensing module 34 in a curvilinear motion; particularly, the curve of the transmission shaft 32 is extremely close to that of the curviform document stand 33 so that the scanning motion is ensured in good time.

Figure 4:
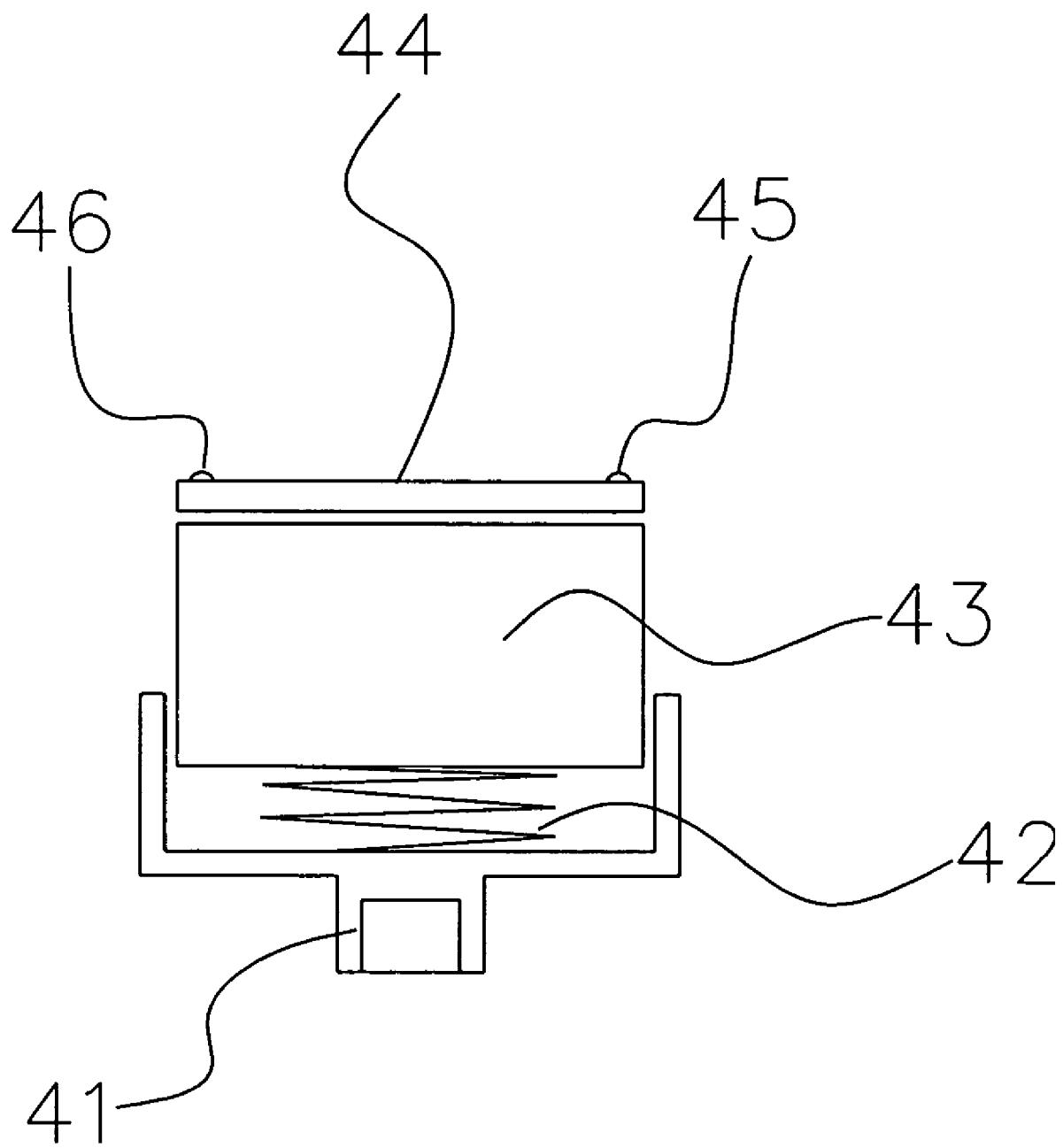
FIG. 4 is the schematic diagram of the optical sensing unit of the present invention.

Referring to FIG. 4 for the structure of the optical sensing module of the present invention, the optical sensing module consists of the sensor unit generally called CIS in the field. First, the optical sensing unit 43 is put into a base case 41; there is an elastic part 42 designed in between the optical sensing unit 43 and the base case 41; the elastic part 42 is a coil spring, a leaf spring or any objects with physical elasticity; the elastic part 42 is primarily to provide the elasticity to the optical sensing unit 43, thus it can perfectly attach to the curviform document stand 33, further the scanning motion is so in tune with the curve that comes the better scanning quality.

Besides, on the side of the optical sensing unit 43 against the base case 41, there is a glass slice 44 or whatever made with the considerable transparent materials. For moving the optical scanning module 34 smoothly on the curviform document stand 33, there are set with a significant number of slides 45, 46 to reduce the friction between the optical scanning module 34 and the curviform document stand 33; even there is a lot of material options for slides and they can be made into the very special slide parts which are extremely slippery and harmless to the document stand.

Furthermore, the surface of the glass slice 44 facing the curviform document stand 33 can be designed with a curve so that it can attach tightly onto the curviform document stand 33.

Based on the above statement together with the optical scanning module, the curvilinear transmission shaft and the curviform document stand of the present invention, there accomplishes the innovative scanner with the curvilinear scanning motion to overcome the inconvenience caused by the typical scanner.

Figure 5:
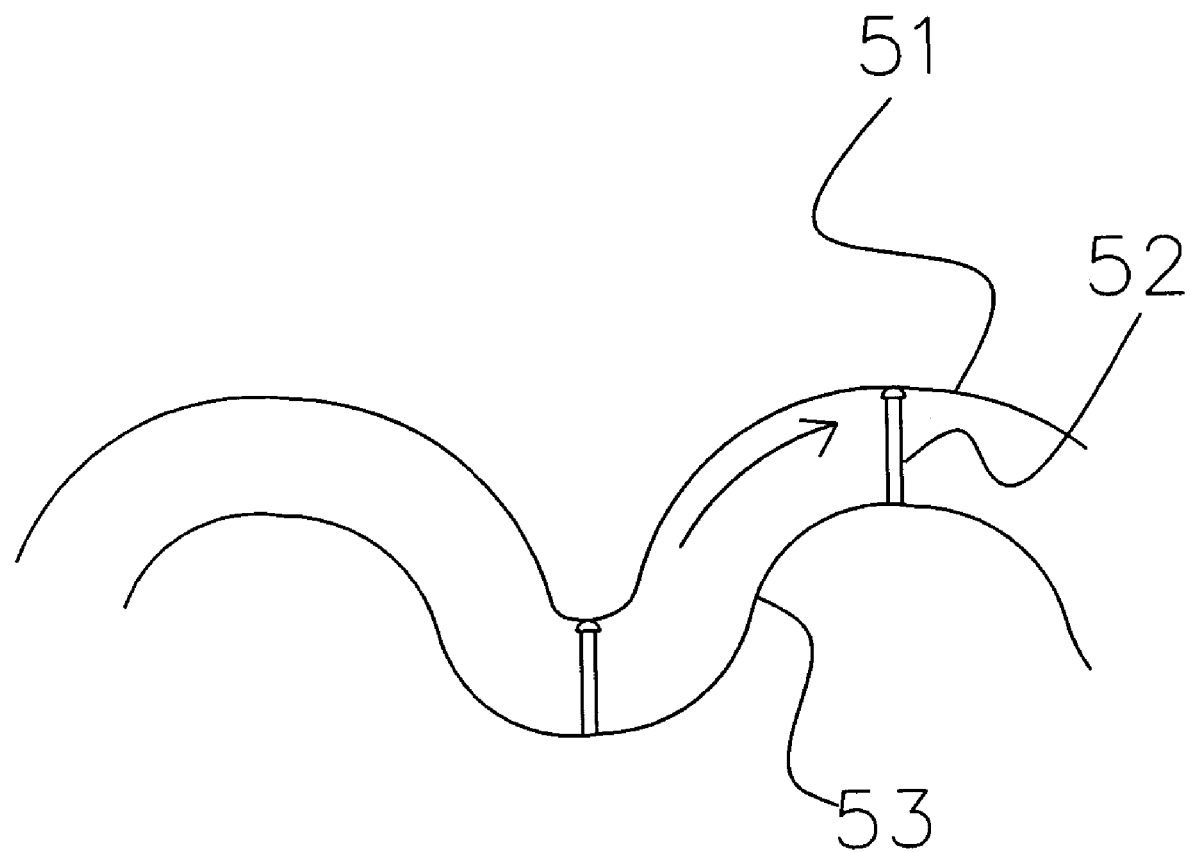
FIG. 5 is the diagram of the second exemplary implementation of the present invention.

Referring to FIG. 5 for the diagram of the second exemplary implementation of the present invention, the curvilinear style scanner of the present invention can do not only the curvilinear scanning motion but also the continuous multi-curves scanning motion. As shown in the drawing, a document stand 51 is with continuous multi-curves; the optical scanning module 52 is propelled by a cam driving mechanism 53 designed upon the multi-curves document stand 51; so it can perform the multi-curves scanning. Additionally, the user is free to alter the continuous multi-curves when the document stand 51 and the driving mechanism 53 are flexible.

Figure 6:
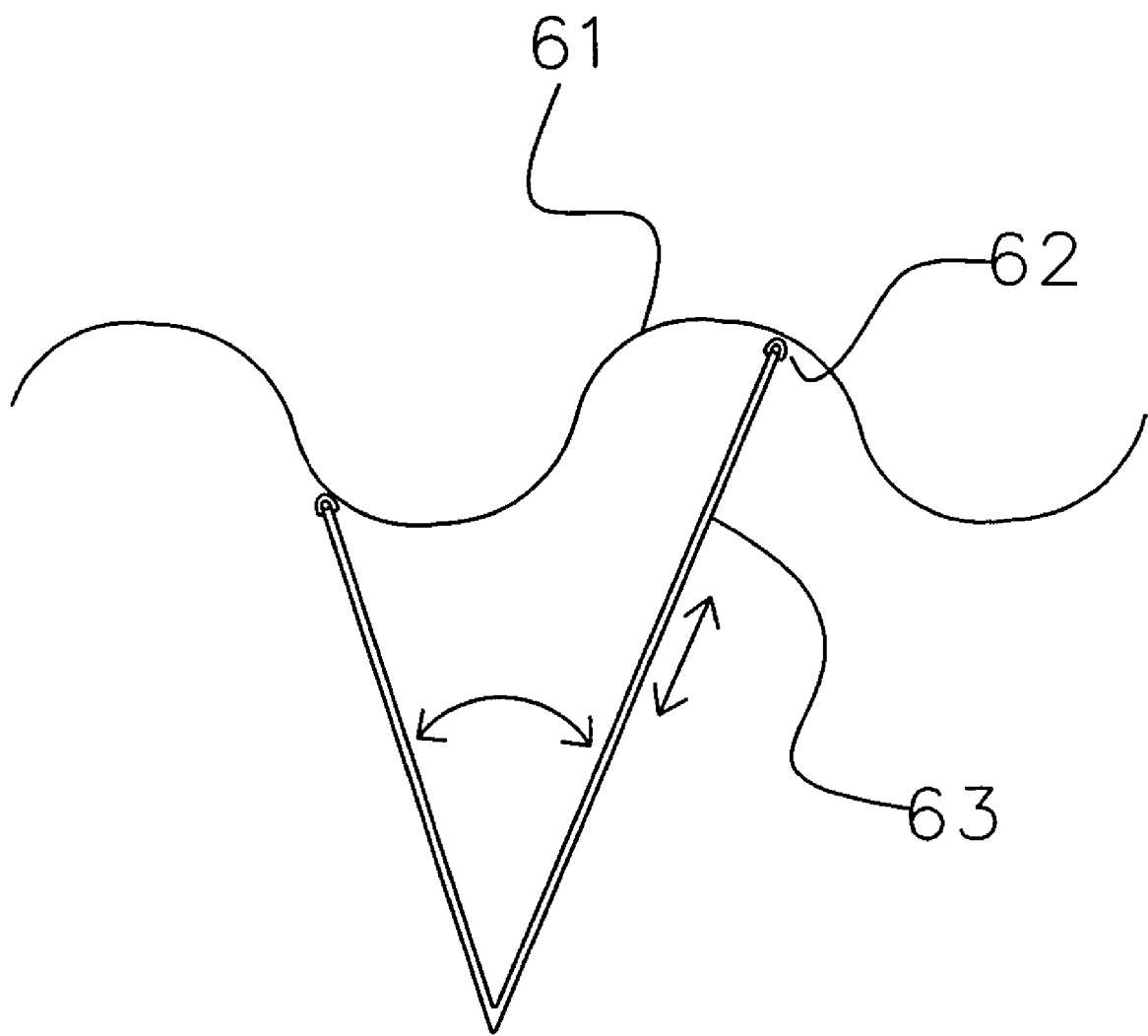
FIG. 6 is the diagram of the third exemplary implementation of the present invention.

Referring to FIG. 6 for the diagram of the third exemplary implementation of the present invention, the curvilinear style scanner of the present invention can do not only the curvilinear scanning motion but also the continuous multi-curves scanning motion. As shown in the drawing, a document stand 61 is with continuous multi-curves; the optical scanning module 62 is propelled by a piston-with-connecting-rod driving device 63, the driving device 63 can do the multi-curve motion in accord to the piston's stretching or shrinking and the connecting rod's circling; due to the characters of the piston and the connecting rod, such exemplary implementation can even perform the discontinuous multi-curve scanning motion.

In the second and third exemplary implementation cases, for matching up the variation of multi-curve, the glass slice of the optical scanning module can be without curve, only the slides have to be increased in height or to be enhanced in elasticity.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

The invention claimed is:

1. A scanning device comprising:
 a main unit;
 a curviform document stand connected with the main unit and configured to hold a document to be scanned, wherein the document stand has a continuously curved scanning surface; and
 an optical sensing module driven by a transmission mechanism along a curved shaft generally corresponding to the continuously curved scanning surface for scanning the document.

2. The scanning device of claim 1, wherein the optical sensing module comprises a base case, an optical sensing unit, and an attachment part.

3. The scanning device of claim 2, wherein the optical sensing module further comprises an elastic part positioned between the optical sensing unit and the base case, wherein the optical sensing unit contacts the curviform document stand as the optical sensing unit is driven along the curved shaft.

4. The scanning device of claim 2, wherein the attachment part comprises a transparent lid and a slide part such that the optical sensing module is configured to slide along the document stand.

5. The scanning device of claim 4, wherein the transparent lid is a glass member having a curvature generally corresponding to a curvature of the curviform document stand.

6. The scanning device of claim 5, wherein the slide part comprises one or more protrusions extending from a top surface of the glass member.

7. The scanning device of claim 3, wherein the elastic part includes a coil spring.

8. A scanner, comprising:
 a housing;
 a document support member carried by the housing, wherein the document support member has a generally arched, non-planar shape; and
 a scanning module positioned beneath the support member and driven along a transmission shaft having a curvature generally corresponding to the arched document support member, wherein the scanning module is configured to scan portions of a document positioned on the arched document support member.

9. The scanner of claim 8 wherein the scanning module comprises an optical sensing unit carried by a base case, and an elastic member positioned between the optical sensing unit and the base case, wherein the optical sensing unit includes a transparent cover member having one or more protrusions extending therefrom to slide against the support member.

10. The scanner of claim 8 wherein the cover member has a curved shape generally corresponding to the arched document support member.

11. A scanner, comprising:

a housing;

means for supporting a document to be scanned, wherein the means for supporting includes a continuously curved support surface carried by the housing; and means for scanning the document through at least a portion of the continuously curved support surface, wherein the means for scanning includes a curved transmission shaft generally corresponding to the curved support surface.

12. The scanner of claim 11, further comprising means for moving the scanning means along the curved transmission shaft.

13. The scanner of claim 11 wherein the means for scanning the document includes an optical sensing unit having means for contacting the continuously curved support surface.

14. The scanner of claim 13 wherein the means for contacting the support surface includes a cover member having a curvature generally corresponding to the continuously curved support surface.

15. The scanner of claim 8 wherein the scanning module comprises a base case, an optical sensing unit, and an attachment part.

16. The scanner device of claim 15 wherein the scanning module further comprises an elastic part positioned between the optical sensing unit and the base case, wherein the optical sensing unit contacts the document support member as the optical sensing unit is driven along the transmission shaft.

17. The scanner of claim 15 wherein the attachment part comprises a transparent lid and a slide part such that the scanning module is configured to slide along the document support member.

18. The scanner of claim 17 wherein the transparent lid is a glass member having a curvature generally corresponding to a curvature of the document support member.

19. The scanner of claim 18 wherein the slide part comprises one or more protrusions extending from a top surface of the glass member.

20. The scanner of claim 16 wherein the elastic part includes a coil spring.

* * * * *